(12) United States Patent
Foster et al.

(10) Patent No.: US 8,348,659 B2
(45) Date of Patent: Jan. 8, 2013

(54) APPARATUS AND METHOD FOR FORMING SKIN ON A CERAMIC BODY BY EXTRUSION

(75) Inventors: Jeffrey O Foster, Horseheads, NY (US); Robert Bernard Lubberts, Woodhull, NY (US); Kenneth Charles Sariego, Beaver Dams, NY (US); David Robertson Treacy, Jr., Horseheads, NY (US)

(73) Assignee: Corning Incorporated, Corning, NY (US)

( * ) Notice: Subject to any disclaimer, the term of this patent is extended or adjusted under 35 U.S.C. 154(b) by 312 days.

(21) Appl. No.: 12/712,418

(22) Filed: Feb. 25, 2010

(65) Prior Publication Data

US 2011/0204544 A1   Aug. 25, 2011

(51) Int. Cl.
*A01J 21/00*   (2006.01)
*B28B 1/00*   (2006.01)
(52) U.S. Cl. ..... 425/464; 425/113; 425/380; 425/382 R; 425/300; 264/630
(58) Field of Classification Search ............ 425/113, 425/380, 382 R, 464, 630, 300; 264/630
See application file for complete search history.

(56) References Cited

U.S. PATENT DOCUMENTS

| | | | |
|---|---|---|---|
| 4,333,896 A | 6/1982 | Cunningham | |
| 4,349,329 A | 9/1982 | Naito et al. | |
| 4,668,176 A | 5/1987 | Zeibig et al. | |
| 4,710,123 A | 12/1987 | Ziebig et al. | |
| 4,915,612 A | 4/1990 | Gangeme et al. | |
| 5,089,203 A | 2/1992 | Kragle | |
| 5,219,509 A | 6/1993 | Cocchetto et al. | |
| 5,256,054 A | 10/1993 | Cocchetto et al. | |
| 5,906,839 A | 5/1999 | Miura et al. | |
| 5,942,260 A | 8/1999 | Kodama et al. | |
| 6,854,969 B2 | 2/2005 | Shibagaki et al. | |
| 6,991,448 B2 | 1/2006 | Lubberts | |
| 2004/0197434 A1* | 10/2004 | Lubberts | 425/380 |
| 2009/0028979 A1* | 1/2009 | Asaoka | 425/382 R |

\* cited by examiner

*Primary Examiner* — Yogendra Gupta
*Assistant Examiner* — Jeremiah Smith
(74) *Attorney, Agent, or Firm* — Matthew J. Mason

(57) ABSTRACT

A honeycomb extrusion apparatus comprises a die body and a flow control device. The die body comprises an inlet end, an outlet end, a central axis, a first set of feedholes, a second set of feedholes, a set of central slots, and a set of outermost peripheral slots. The first set of feedholes extends from the inlet end to an interior interface portion of the die body. The second set of feedholes extends through the die body from the inlet end to the outlet end. The set of central slots extends from the outlet end to the interior interface portion of the die body. The set of outermost peripheral slots is disposed radially outwardly of the central slots. The interior interface portion of the die body is configured to allow flow of the batch material from the first set of feedholes to the central slots and to the outermost peripheral slots.

11 Claims, 7 Drawing Sheets

US 8,348,659 B2

APPARATUS AND METHOD FOR FORMING SKIN ON A CERAMIC BODY BY EXTRUSION

TECHNICAL FIELD

The present disclosure relates generally to honeycomb extrusion die apparatus and methods and, more particularly, to dies apparatus and methods for controlling formation of a skin of a ceramic honeycomb body.

BACKGROUND

Conventional methods for extruding honeycomb bodies can co-extrude the outer skin and the inner matrix of the honeycomb bodies. However, such methods may cause defects in the outer skin that render the honeycomb body unusable or require further processing.

SUMMARY

In one aspect, a honeycomb extrusion apparatus is provided for extruding batch material. The apparatus comprises a die body and a flow control device. The die body comprises an inlet end, an outlet end, a central axis, a first set of feedholes, a second set of feedholes, a set of central slots, and a set of outermost peripheral slots. The first set of feedholes extends from the inlet end to an interior interface portion of the die body. The second set of feedholes extends through the die body from the inlet end to the outlet end. The set of central slots extends from the outlet end to the interior interface portion of the die body. The set of outermost peripheral slots is disposed radially outwardly of the central slots. The interior interface portion of the die body is configured to allow flow of the batch material from the first set of feedholes to the central slots and to the outermost peripheral slots. The flow control device is disposed at the inlet end of the die body and comprises a flow blocking portion for blocking flow of the batch material at the inlet end of the die body into feedhole inlets of the first set of feedholes which directly feed the outermost peripheral slots.

In another aspect, a method of extruding a honeycomb comprising the steps of providing a die body comprising an inlet end, an outlet end, a central axis, a first set of feedholes extending from the inlet end to an interior interface portion of the die body, a set of central slots extending from the outlet end to the interior interface portion of the die body, a set of outermost peripheral slots disposed radially outwardly of the central slots, and providing a flow control device at the inlet end of the die body to block flow of batch material at the inlet end of the die body into feedhole inlets of the first set of feedholes which directly feed the outermost peripheral slots. The interior interface portion of the die body is configured to allow flow of the batch material from the first set of feedholes to the central slots and to the outermost peripheral slots.

In yet another aspect, a method of forming a honeycomb body by extrusion of ceramic-forming batch material through an extrusion die is provided. The honeycomb body has an outermost circumferential wall surrounding a matrix of intersecting honeycomb walls. The die comprises a die body comprising an inlet end, an outlet end, a central axis, a set of central slots extending from the outlet end to an interior interface portion of the die body, a set of outermost peripheral slots disposed radially outwardly of the central slots. The interior interface portion of the die body is configured to allow flow of the batch material from a first set of feedholes to the central slots and to the outermost peripheral slots. The method comprises providing a supply flow of the batch material to the inlet end of the die body, and splitting the supply flow into a central flow and a peripheral flow. The central flow passes through the set of central slots to form the matrix of intersecting honeycomb walls, and the peripheral flow passes through the second set of feedholes and out the outlet end of the die body without passing through any slot in the die. The outermost circumferential wall comprises batch material from the peripheral flow.

BRIEF DESCRIPTION OF THE DRAWINGS

These and other features, aspects and advantages of the present disclosure are better understood when the following detailed description is read with reference to the accompanying drawings, in which.

DETAILED DESCRIPTION

Figure 1:
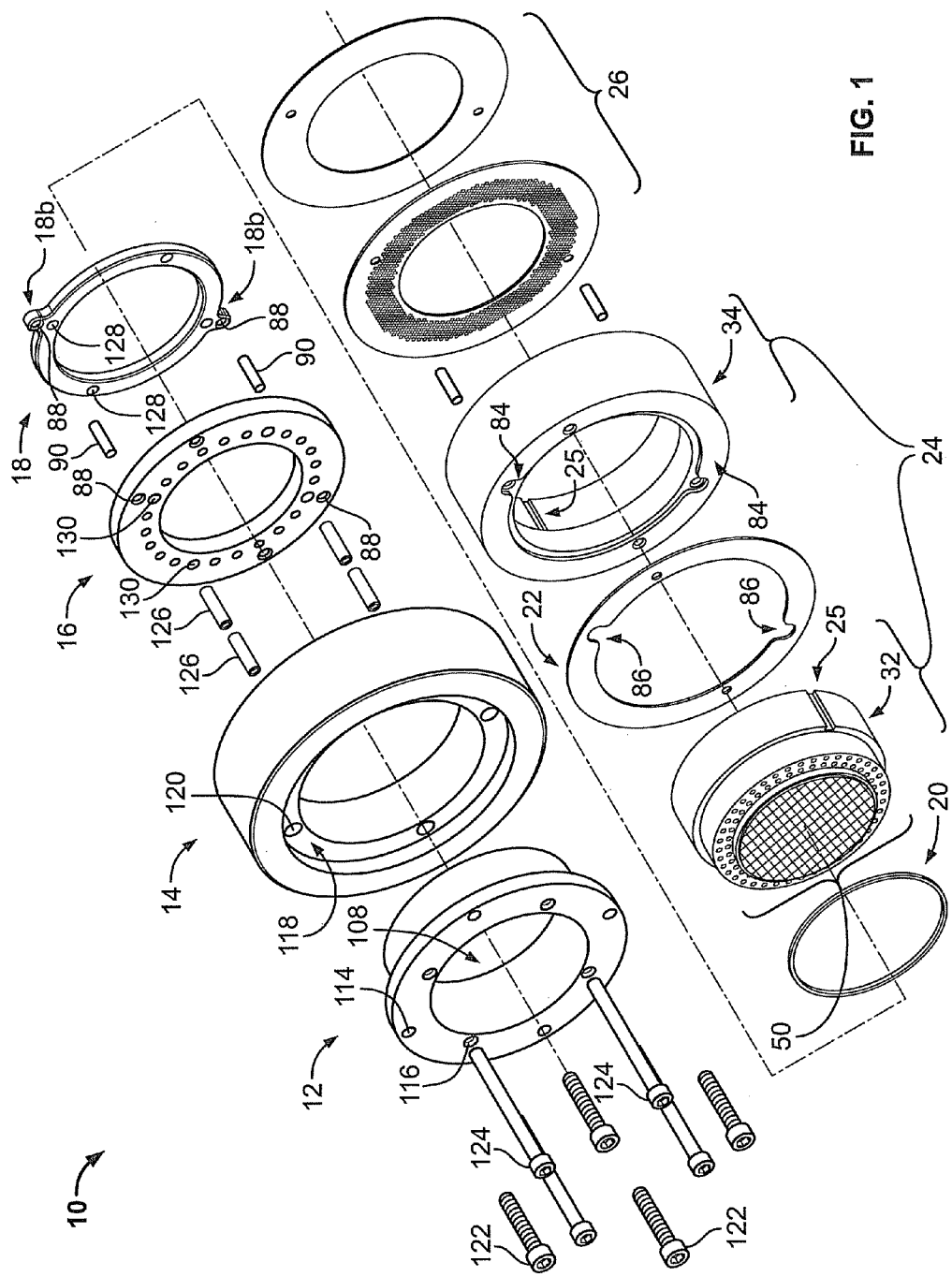
FIG. 1 is an exploded perspective view of an example honeycomb extrusion apparatus as disclosed herein.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

Referring now to FIG. 1, an example embodiment of a honeycomb extrusion apparatus 10 for extruding batch material is illustrated with features to be described herein. FIG. 1 is an exploded view of the extrusion apparatus 10 the components of which may include, among others, an insert 12, a holder 14, a mask 16, a throttle 18, a throttle seal 20, a shim 22, a die body 24, and a flow control device 26.

Figure 2:
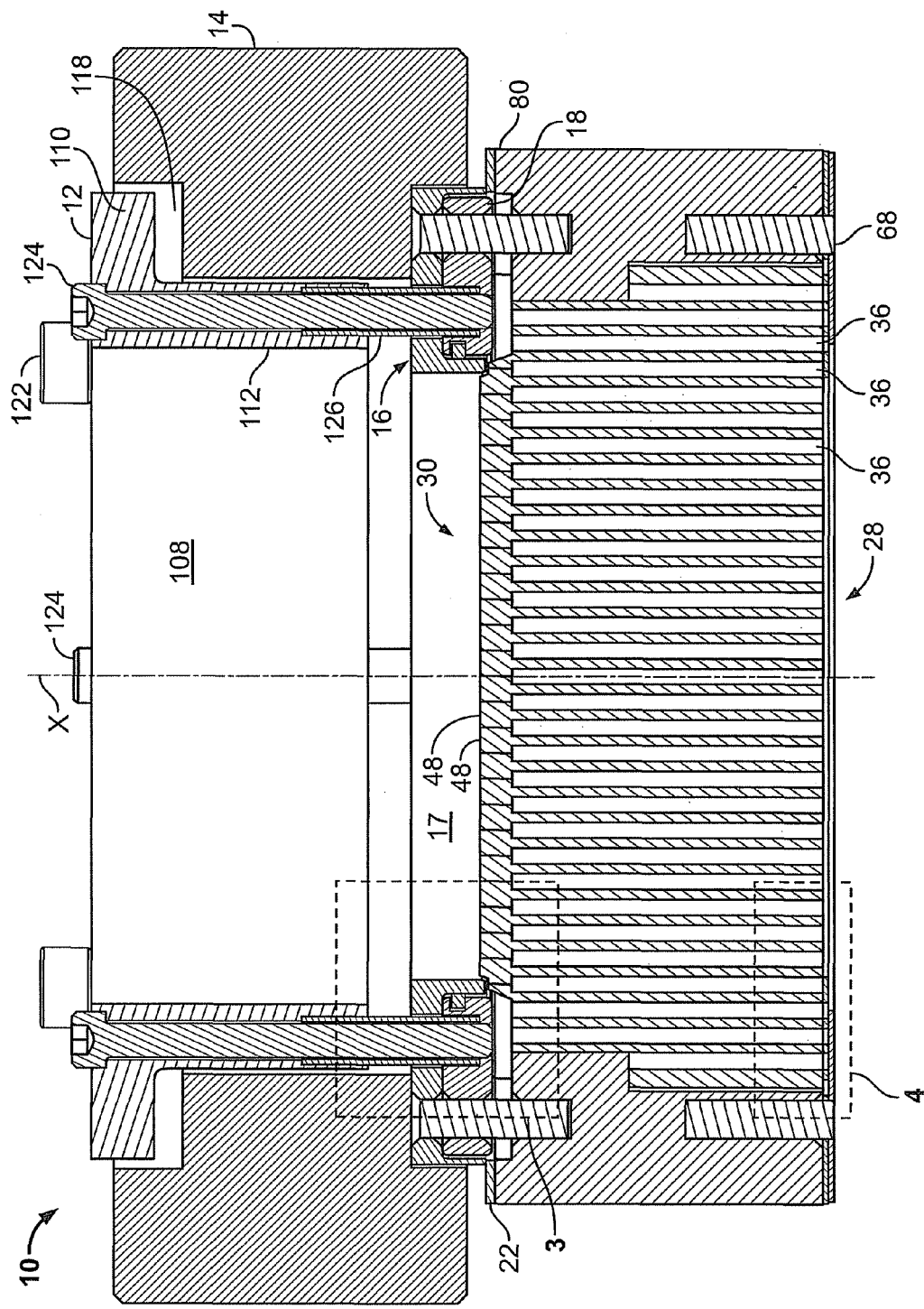
FIG. 2 is a cross-sectional view of the honeycomb extrusion apparatus of FIG. 1.

FIG. 2 shows a cross-section of the extrusion apparatus 10 in an assembled state along the longitudinal direction of the extrusion apparatus 10. A batch of materials is adapted to flow from an upstream side to a downstream side of the extrusion apparatus 10 which would correspond respectively to a bottom side and a top side in FIG. 2. While this example extrusion apparatus 10 is embodied in a substantially cylindrical shape with a substantially circular cross-section, an extrusion apparatus 10 that has a variety of cross-sectional shapes, for example, polygonal or irregularly shaped cross-sections, can also be contemplated. The term "honeycomb" is not necessarily meant to convey that products resulting from the extrusion process will be identical to honeycombs having hexagonal cells, but rather should be interpreted to mean that a structure made up of a plurality of neighboring cells is produced, such as square, rectangular, circular, oval, triangular, pentagonal cells.

As shown in FIGS. 1-2, the die body 24 includes an inlet end 28, an outlet end 30 and extends longitudinally about a central axis X that is oriented substantially parallel to the direction of batch flow during the extrusion process. In the embodiment shown in FIGS. 1-2, the die body 24 includes a die 32 and a die holder 34 inside of which the die 32 is adapted to be inserted, although the die body 24 may also be a one-piece component. The die 32 and the die holder 34 may include depressions 25 in which pins can be placed to help align the die 32 and the die holder 34.

Referring to FIGS. 2-4 and 5-6, a plurality of channels 36 is formed to extend through the die body 24 substantially parallel to the central axis X allowing the batch of materials to move from the inlet end 28 to the outlet end 30. The channels 36 are disposed across a plane transverse to the central axis X in a manner to be described below. Each of the channels 36 may include a feedhole inlet 38, a feedhole 40 and an outlet 42. The feedhole inlets 38 are provided on the inlet end 28 of the die body 24 and allow the batch to enter the die body 24 while the feedholes 40 allow the batch to be channeled from the inlet end 28 toward the outlet end 30 of the die body 24. The outlet 42 on an outlet face 50 may be a feedhole outlet 43 or a slot 44. In the embodiment shown in FIGS. 2-4, some of the channels 36 may include further a slot 44 downstream of the feedhole 40 and the feedholes 40 transition to the slot 44 at an interior interface portion 46. The feedholes 40 and the respective slots 44 are in fluid communication capable of allowing the batch to flow through, although the cross-sectional area of the slots 44 may be substantially smaller than the cross-sectional area of the feedholes 40.

The slots 44 are separated and defined by a plurality of pins 48 disposed on the outlet end 30 of the die body 24. The shape of cells of the honeycomb structure will depend on the arrangement of the pins 48 in a plane that is transverse to the central axis X. In other words, when a cross-section of the die body 24 across the central axis X is viewed, a network, array or matrix of the pins 48 may have a row-and-column pattern, a radiating pattern, an irregular pattern, or any other desired pattern that determines the shape and relative spacing of the cell arrangement in the resulting honeycomb body.

Referring to FIGS. 1, 3 and 5-6, the outlet end 30 of the die body 24 includes the outlet face 50 that has a centrally protruding portion 52. The feedholes and slots are omitted from the die 32 in FIGS. 5-6 for ease of illustration. Although these features are embodied in the die 32, shown in FIG. 1, a unitary die body 24, otherwise having the same features, may be provided instead. The centrally protruding portion 52 has a two-step configuration along the perimeter such that the outlet face 50 includes a distal surface 54, a first axially recessed surface 56 and a second axially recessed surface 58. Specifically, the first axially recessed surface 56 surrounds the distal surface 54 and is disposed farther toward the inlet end 28 than the distal surface 54 while the second axially recessed surface 58 surrounds the distal surface 54 and is disposed farther toward the inlet end 28 than the first axially recessed surface 56. The extent to which the second axially recessed surface 58 is disposed toward the inlet end 28 with respect to the first axially recessed surface 56 need not be the same as the extent to which the first axially recessed surface 56 is disposed toward the inlet end with respect to the distal surface 54. The distal surface 54 transitions to the first axially recessed surface 56 through a first transition surface 60 which may be angled with respect to the central axis X. The first axially recessed surface 56 transitions to the second axially recessed surface 58 through a second transition surface 62 which may also be angled with respect to the central axis X. The second axially recessed surface 58 may be formed so as to be coplanar with the interior interface portion 46 at which the feedholes 40 transition to the slots 44.

Figure 3:
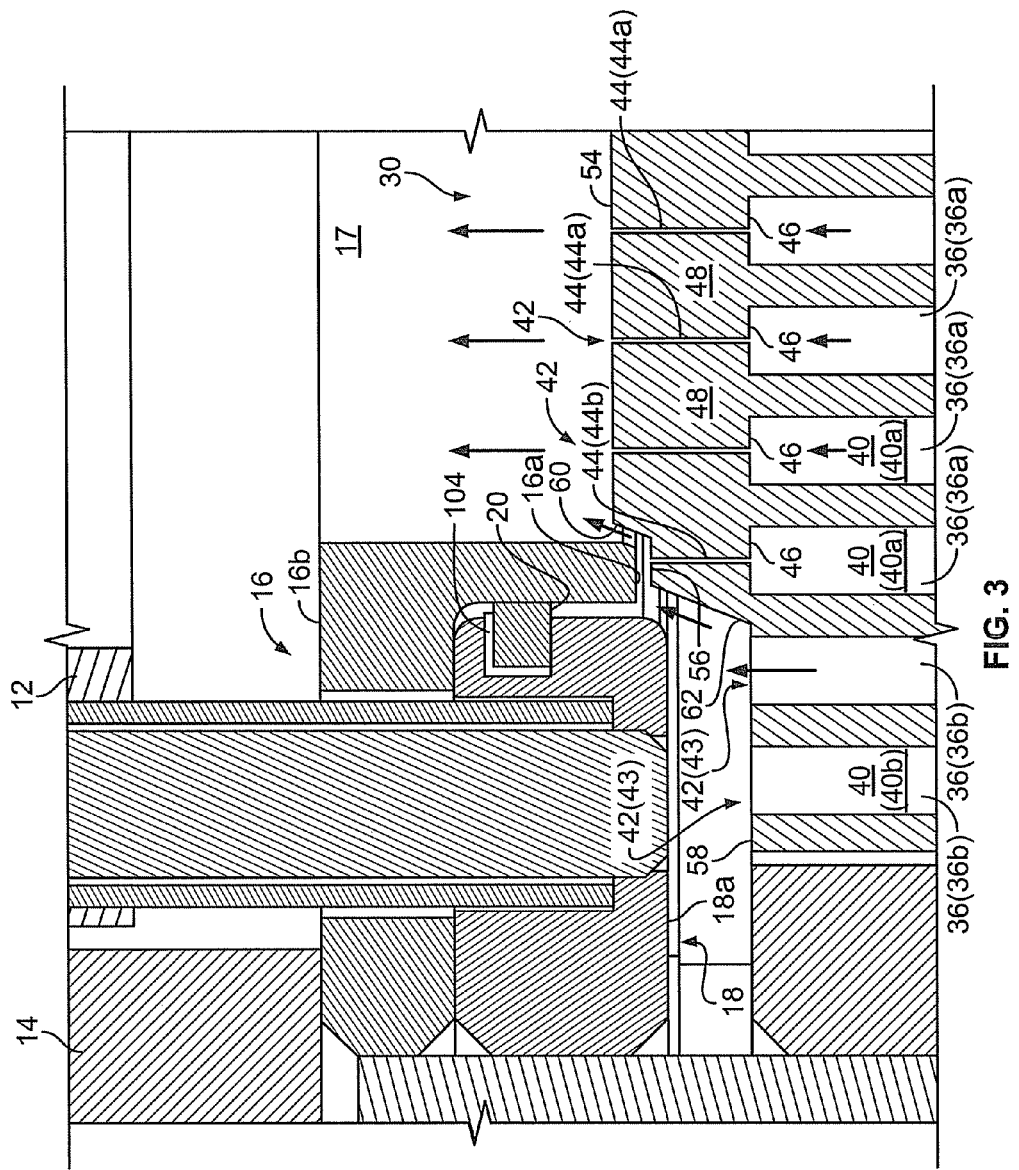
FIG. 3 is a partial cross-sectional view of the honeycomb extrusion apparatus of FIGS. 1 and 2 near an outlet end of a die body.

Depending on the arrangement within the die body 24, the outlet 42 of the channels 36 may be at the distal surface 54, the first axially recessed surface 56 or the second axially recessed surface 58, each of the three being shown in FIG. 3. The channels 36 may be categorized as a first set of channels 36a and a second set of channels 36b. The first set of channels 36a includes a first set of feedholes 40a which extend from the inlet end 28 of the die body 24 to the interior interface portion 46. Moreover, depending on the arrangement within a plane transverse to the central axis X, the first set of channels 36a may include either a central slot 44a or an outermost peripheral slot 44b. The outermost peripheral slots 44b are configured to extend from the interior interface portion 46 to the first axially recessed surface 56 while the central slots 44a are configured to extend from the interior interface portion 46 to the distal surface 54. As a consequence of the disposition of the first axially recessed surface 56 with respect to the distal surface 54, the outermost peripheral slots 44b are disposed radially outwardly of the central slots 44a. Thus, the outlet 42 of the central slot 44a is located at the distal surface 54 while the outlet 42 of the outermost peripheral slot 44b is located at the first recessed surface 56. In comparison, the second set of channels 36b includes a second set of feedholes 40b which extend from the inlet end 28 of the die body 24 to the second axially recessed surface 58 and does not include a slot 44 near the outlet end 30 of the die body 24. Thus, the outlets 42 of the second set of channels 36b are located at the second axially recessed surface 58 and are in direct fluid communication with the second set of feedholes 40b.

Figure 4:
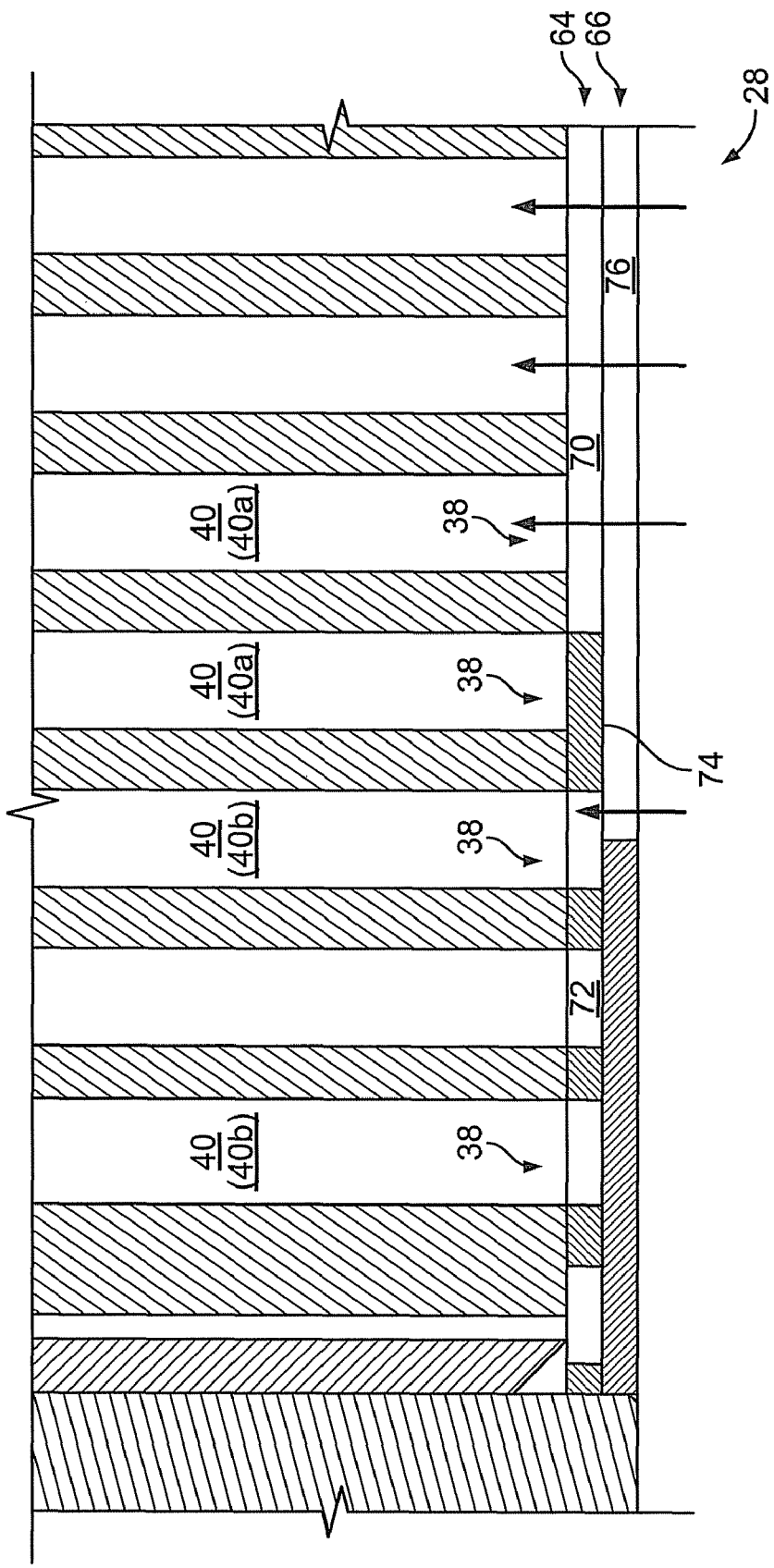
FIG. 4 is a partial cross-sectional view of the honeycomb extrusion apparatus of FIGS. 1, 2 and 3 near an inlet end of the die body.
Figure 7:
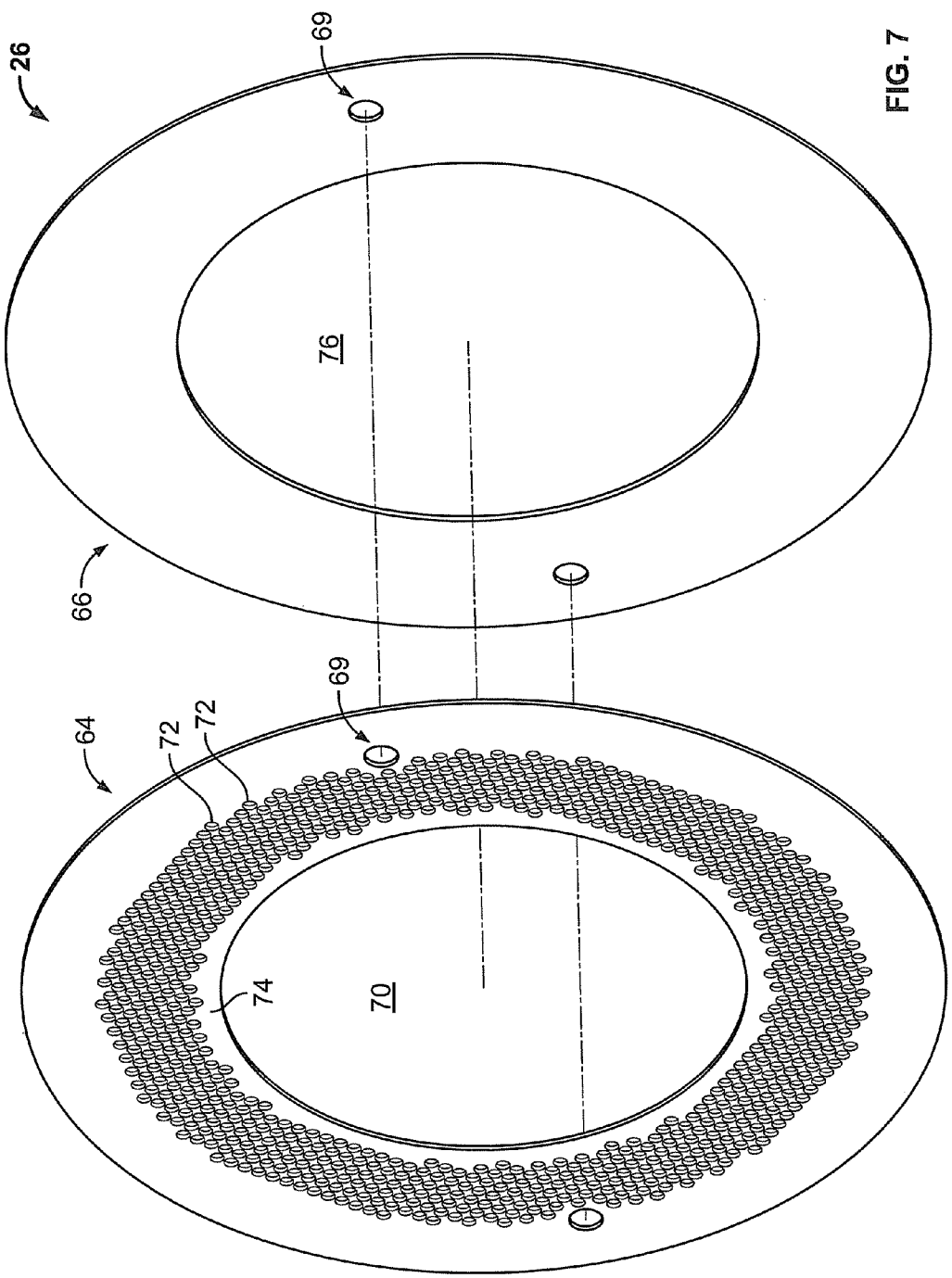
FIG. 7 is a perspective view of a flow dividing portion and a flow regulating portion of a flow control device of the apparatus of FIGS. 1-6.

Upstream of the feedhole inlets 38, as shown in FIG. 4, a flow control device 26 is configured to be mounted on the inlet end 28 of the die body 24 so as to contact the inlet end 28 and to divide or split a supply flow of batch material into a central flow, or a first quantity of batch material, and a peripheral flow, or a second quantity of batch material. As shown in FIG. 7, the flow control device 26 may include a flow dividing portion 64 and a flow regulating portion 66 which may be secured to the inlet end 28 of the die body 24 through securing means known in the art, such as pins 68 and apertures 69 (FIGS. 2 and 7). The flow dividing portion 64 may be a substantially annular component having a central through-hole 70 and a plurality of through-holes 72. The inner dimension of the central through-hole 70 (e.g., diameter) is such that the feedhole inlets 38 of the first set of channels 36a having central slots 44a are exposed. The flow dividing portion 64 splits or divides the batch material into the central flow and the peripheral flow with the central flow being supplied to the central through-hole 70 and the peripheral flow being supplied to the plurality of through-holes 72. The plurality of through-holes 72 is disposed so as to be in alignment with the feedhole inlets 38 of the second channels 36b. The plurality of through-holes 72 may be configured so as to be identical in size and shape to the feedhole inlets 38 of the second set of feedholes 40b of the second set of channels 36b. Moreover, the flow dividing portion 64 further includes a flow blocking portion 74 (FIG. 4) which blocks the feedhole inlets 38 of the first set of channels 36b having outermost peripheral slots 44b. As a result, a flow of batch material is prevented by the flow blocking portion 74 from entering the first set of feedholes 40a that directly feed the outermost peripheral slots 44b.

Furthermore, the flow regulating portion 66 may be configured to contact the flow dividing portion 64 on the upstream side and may also have an annular shape so as to give the flow control device 26 a substantially annular geometry. The overall diameter of the flow regulating portion 66 may be similar to the flow dividing portion 64. Unlike the flow dividing portion 64, the flow regulating portion 66 need not be configured with features similar to the through-holes 72 of the flow dividing portion 64 and may simply include a first central opening 76. The inner dimension of the first central opening 76 of the flow regulating portion 66 (e.g., diameter) is larger than inner dimension of the central through-hole 70 but not so large as to expose all of the through-holes 72 of the flow dividing portion 64. As a result, the flow of batch material to the central through-hole 70 of the flow dividing portion 64 is not impeded by the central opening 76 while a subset of the plurality of through-holes 72 of the flow dividing portion 64 are partially blocked by the flow regulating portion 66 so that flow rate to the second set of channels 36*b* is regulated.

Referring back to a downstream side of the die body 24, the outlet end 30 of the die body 24 includes an elevated periphery 80 (FIG. 2) that is radially outward of the second axially recessed surface 58 and against which the annular shim 22 may be placed. In this embodiment, the elevated periphery 80 is part of the die holder 34. The second axially recessed surface 58 may be disposed to be farther toward the inlet end 28 than the elevated periphery 80 of the outlet end 30. Parts of the elevated periphery 80 may include recessed portions 84 to accommodate the throttle as will be discussed below. An inner perimeter of the annular shim 22 may also include cut-outs 86 (FIG. 1) adapted to match the recessed portions 84 in shape and to facilitate the accommodation of the throttle between the mask 16 and the outlet end 30 of the die body 24.

Figure 5:
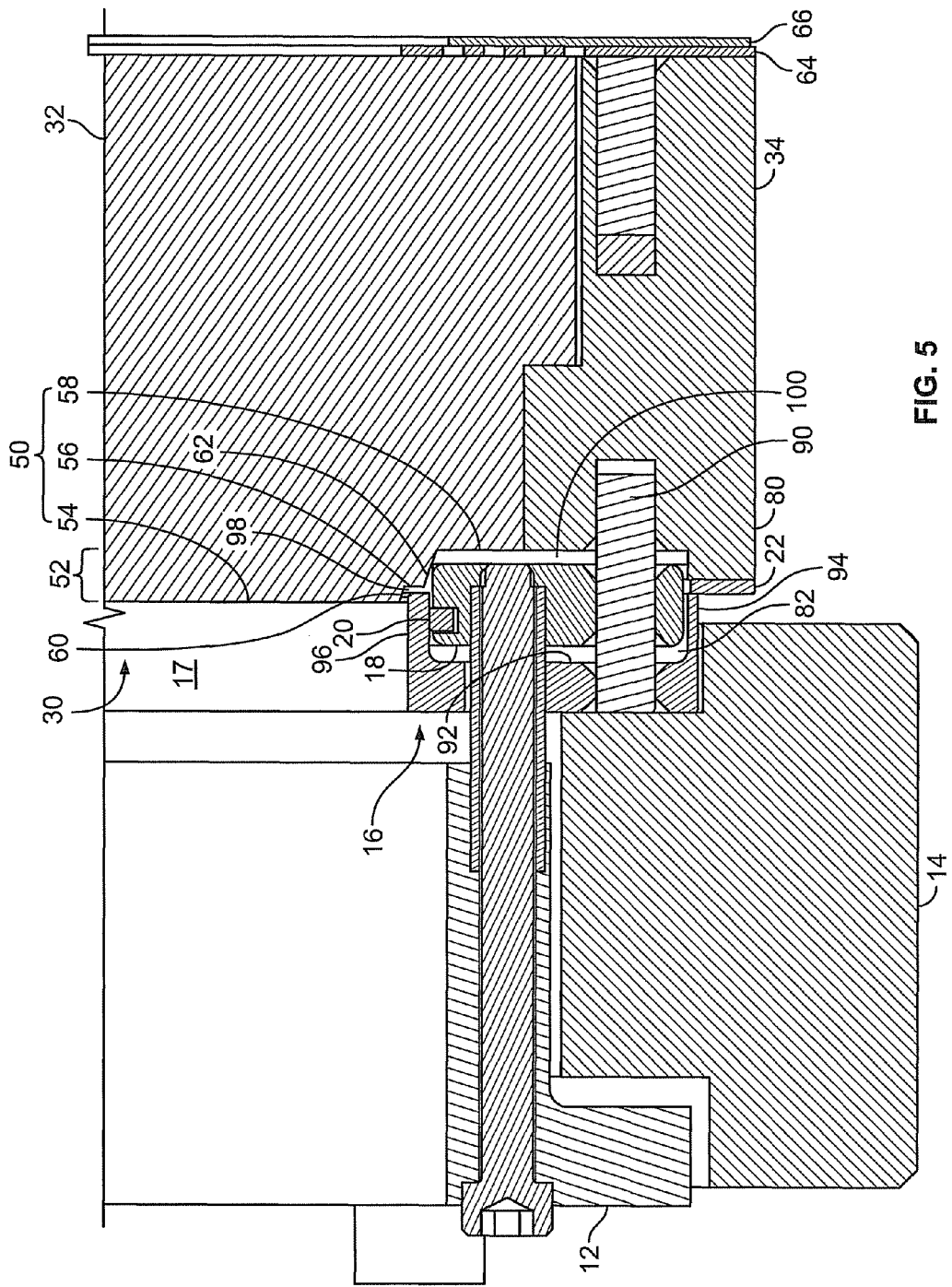
FIG. 5 is a partial cross-sectional view of the honeycomb extrusion apparatus of FIGS. 1-4 shown with a throttle in a first position.
Figure 6:
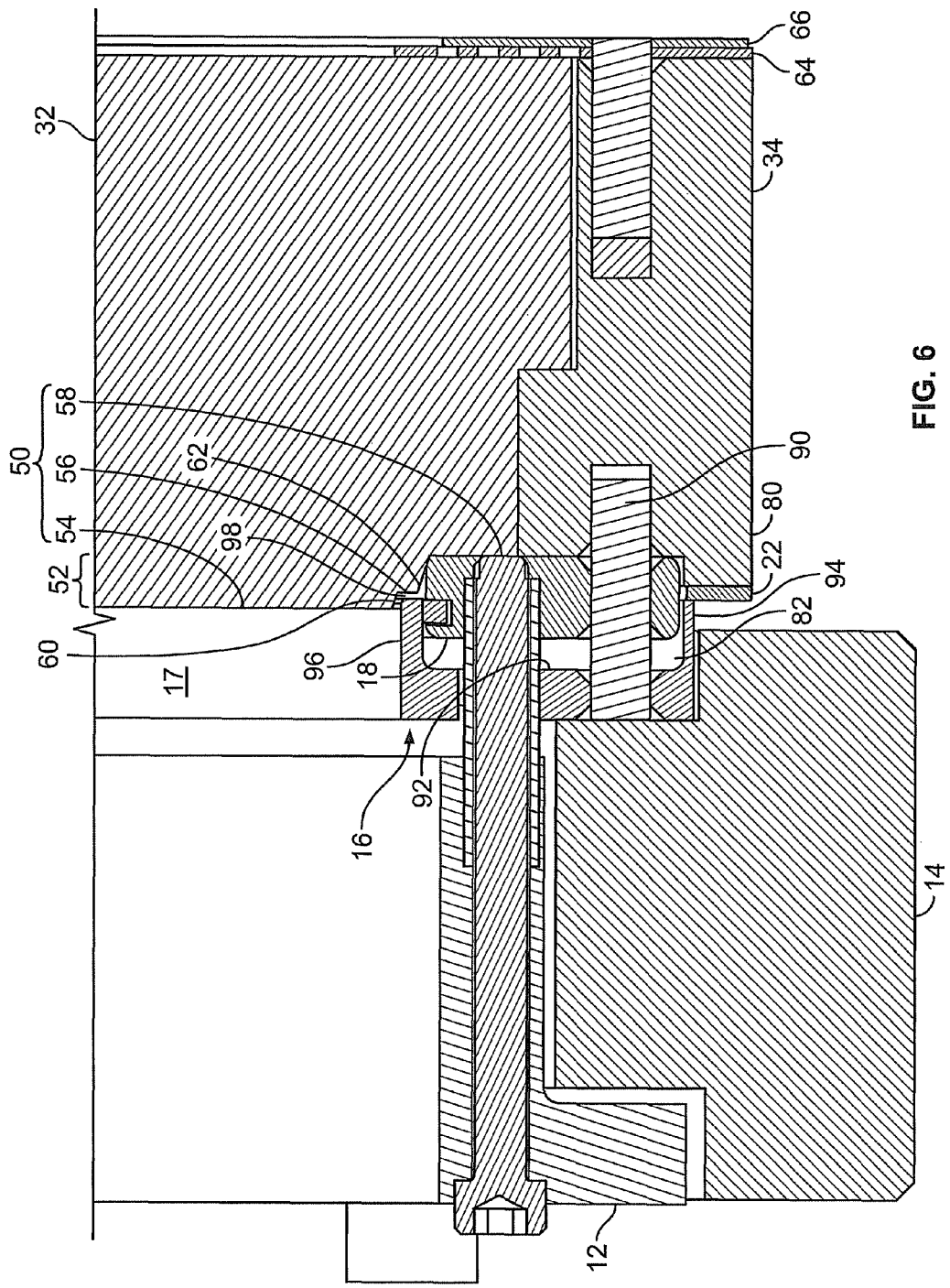
FIG. 6 is a partial cross-sectional view of the honeycomb extrusion apparatus of FIGS. 1-5 shown with the throttle in a second position.

Downstream of the die body 24, the extrusion apparatus 10 includes a mask 16 that is disposed on the outlet end 30 of the die body 24 to control a skin formation of the honeycomb body. The mask 16 is a generally annular component with a second central opening 17 and includes an inlet end 16*a* and an outlet end 16*b* (FIG. 3). The mask 16 may be configured with apertures 88 (FIG. 1) that extend through the mask 16 and allow the mask 16 to be aligned in a desired manner with neighboring components by using securing means such as pins 90. The inlet end 16*a* of the mask 16 is disposed proximate the outlet end 30 of the die body 24 and is configured with a recessed section 92 that forms a cavity 82 in conjunction with the outlet end 30 of the die body 24 when the mask 16 is mounted thereto as shown in FIGS. 5-6. The inlet end 16*a* of the mask 16 also includes an outer axially protruding peripheral portion 94 and an inner axially protruding peripheral portion 96 between which the recessed section 92 is formed. The mask 16 is mounted proximate on the outlet end 30 of the die body 24 such that the outer axially protruding peripheral portion 94 is placed against the shim 22 while the inner axially protruding peripheral portion 96 is disposed proximate but spaced away from the first axially recessed surface 56 thus forming a passage 98 from the second set of channels 36*b* to the second central opening 17. Thus, the cavity 82 becomes bounded on the upstream side by the die body 24, on the downstream side by the mask 16, and radially outwardly by the shim 22. The geometric parameters of the passage 98, i.e., the skin gap and the face gap, may be controlled by altering the thickness of the shim 22. Alternatively, it may be possible to change the same geometric parameters of the passage 98 by changing the height of the outer axially protruding peripheral portion 94 of the mask 16 and, in some embodiments, doing away with the shim 22, or by altering the geometry of the inner axially protruding peripheral portion 96. Regardless of whether the geometric parameters are varied by altering the dimensions or geometry of the shim 22, the outer axially protruding peripheral portion 94 or the inner axially protruding peripheral portion 96, the mask 16 is configured to allow batch material from the second set of channels 36*b* to flow between the mask 16 and the die body 24.

The throttle 18 is an annular component that is disposed proximate the second set of channels 36*b* so as to partially fill the cavity 82 and move along the central axis X upon manipulation by an operator as described below. A reservoir 100 is formed when the throttle 18 is spaced away from the outlet face 50 or the second axially recessed surface 58 and is in communication with the second set of channels 36*b* of the die body 24 from which the batch of material are directly fed. Selective volumetric control of the reservoir 100 is made possible with this arrangement in that the volume of the reservoir 100 is reduced as the throttle 18 is moved in the upstream direction and is increased as the throttle 18 is moved in the downstream direction. The range of movement of the throttle 18 is such that, when the volume of the reservoir 100 is at its highest, a downstream face of the throttle 18 contacts the recessed section 92 of the mask 16 while, when the volume of the reservoir 100 is at its lowest (e.g., zero), an upstream face 18*a* (FIG. 2) of the throttle 18 contacts the second axially recessed surface 58 thus blocking the outlets 42 of the second channels 36*b* and preventing batch flow into the reservoir 100. In other words, the movement of the throttle 18 can selectively adjust the flow of batch material from the second set of channels 36*b* that pass between the throttle 18 and the die body 24. The upstream face 18*a* of the throttle 18 can be configured so as to vary radially in thickness and such a configuration would allow some, but not all, of the outlets 42 of the second set of channels 36*b* to be blocked selectively. The geometry of the throttle 18 and the centrally protruding portion 52 of the outlet end 30 of the die body 24 and their positional disposition may be such that the batch of materials is able to flow from the reservoir 100 to the passage at all positions of the throttle 18 except when the outlets 42 on the second axially recessed surface 58 are blocked. The throttle 18 may include tabs 18*b* (FIG. 1) that are configured to fit within the recessed portions 84 in the elevated periphery 80 of the outlet end 30 and the cut-outs 86 of the shim 22. The mask 16, the tabs 18*b* of the throttle 18 and the recessed portions 84 on the elevated periphery 80 may include apertures 88 through which pins 90 can be inserted to facilitate alignment of these components. Moreover, an inner periphery of the throttle 18 may include an indentation 104 (FIG. 3) that can house the ring-shaped seal 20 in order to help seal the reservoir 100. The seal 20 may be made of materials suitable for sealing of fluid, such as ultra high molecular weight polyethylene (UHMWPE or UHMW).

Further downstream of the mask 16, as shown in FIGS. 1-2, the extrusion apparatus 10 may include a substantially tubular insert holder 14 that is configured to enclose the mask 16 and a substantially tubular insert 12 that is partially housed interiorly of the insert holder 14. The insert holder 14 and the insert 12 combine to form a tube-in-tube structure where the insert 12 is movable along the central axis X with respect to the insert holder 14 and where the batch of materials exiting from the second central opening 17 of the mask 16 is allowed to flow through a third central opening 108 of the insert 12 and out of the extrusion apparatus 10. A downstream end of the insert 12 includes a flange 110 that projects radially outward from a cylindrical wall 112 of the insert 12. The flange 110 is configured with a first set of apertures 114 and a second set of apertures 116. The first set of apertures 114 are disposed radially outward of the second set of apertures 116 on the flange 110 and extend through the flange 110 of the insert 12. In comparison, the second set of apertures 116 extends through the flange 110 and the cylindrical wall 112 of the insert 12. The insert holder 14 includes an annular recess 118 that includes a third set of apertures 120 that is configured to be aligned with the first set of apertures 114. The first set 114 and the third set 120 of apertures are configured to accept adjusting screws 122 that can be manipulated to move the insert 12 with respect to the insert holder 14 along the central axis X. Meanwhile, the second set of apertures 116 is provided to allow the insertion of coupling screws 124 in order to couple the insert 12 to the throttle 18 so that the insert 12 and the throttle 18 move as a unit when the insert 12 is moved along the central axis X by manipulation of the adjusting screws 122. The coupling screws 124 are of such length as to extend through the insert 12 and the mask 16 and reach the throttle 18. An upstream end of the insert 12 and the throttle 18 are configured to allow standoffs 126 to extend therebetween so as to couple the insert 12 and the throttle 18. The throttle 18 includes a fourth set of apertures 128 into which the standoffs 126 can extend. The mask 16 includes the fifth set of apertures 130 that is sufficiently larger in diameter than the standoffs 126 to allow the standoffs 126 to pass through without hindrance. As a result, as the insert 12 and the throttle 18 are moved as one along the central axis X, the mask 16 remains stationary.

The throttle 18 may be flexible or adjustable such that one portion of the throttle 18 can undergo greater movement along the central axis X than another portion of the throttle 18. In other words, the adjusting screws 122 may be manipulated to move deeper into a corresponding one of the third set of apertures 120 and cause a first perimeter portion of the throttle 18 to move along the central axis X independently a second perimeter portion of the throttle 18. The portion of the throttle 18 may vary in circumferential length and may make up a half, a quarter, an eighth or a different portion of the perimeter, or circumference in case of an annular throttle 18. The number of portions on the throttle 18 that are independently adjustable may depend on the flexibility of the throttle 18 and/or the number of adjustment screws 122 provided around the perimeter. The throttle 18 may be made of various flexible materials known in the art such as rubber and the degree of flexibility of a material may affect the degree of possible adjustment. A throttle 18 made of metallic materials may also allow independent adjustment of different portions of the throttle 18 depending on the degree of movement required for the adjustment. Moreover, the throttle 18 may undergo changes in cross-sectional shape such that the dimensions of the throttle 18 change in radial and axial directions.

Using the extrusion apparatus 10 discussed above, a flow of batch material supplied to the inlet end 28 of the die body 24 moves through the flow control device 26 where the batch material is divided by the flow dividing portion 64 into a central flow for forming an inner matrix of intersecting walls of a honeycomb body and a peripheral flow for forming an outermost circumferential wall or skin of the honeycomb body. The central flow is allowed to flow to the first set of channels 36a that includes the first set of feedholes 40a and the central slots 44a while the peripheral flow is allowed to flow to the second set of channels 36b which includes the second set of feedholes 40b but no slots. The flow blocking portion 74 of the flow control device 26 blocks the first set of channels 36a that includes the first set of feedholes 40a which directly feed the outermost peripheral slots 44b. Upstream of the flow blocking portion 74, the flow regulating portion 66 allows the central flow to move substantially without hindrance to the flow dividing portion 64 while regulating the flow rate of the peripheral flow by partially blocking the plurality of through-holes 72 on the flow dividing portion 64.

Near the outlet end 30 of the die body 24, the central flow exiting from the central slots 44a forms the inner matrix of intersecting walls. The peripheral flow exits from the outlets 42 of the second set of feedholes 40b of the second set of channels 36b and enters the reservoir 100. Thus, the peripheral flow moves through the die body 24 without passing through any slot in the die body 24. The flow rate from the reservoir 100 to the passage 98 is controlled by adjusting the position of the throttle 18 along the central axis X by manipulation of the adjusting screws 122 on the insert. As a result, the peripheral flow from the second set of channels 36b through the reservoir 100 to the passage 98 can be volumetrically controlled. Moreover, by preventing batch flow through the outermost peripheral slots 44b from intersecting with batch flow through the passage 98, a peripheral flow having enhanced homogeneity in the molecular orientation may be obtained, and we have observed a reduction in defect formation in the outermost peripheral skin.

In one set of embodiments, a honeycomb extrusion apparatus for extruding batch material is disclosed herein, the apparatus comprising: a die body comprising an inlet end, an outlet end, a central axis, a first set of feedholes extending from the inlet end to an interior interface portion of the die body, a second set of feedholes extending through the die body from the inlet end to the outlet end, a set of central slots extending from the outlet end to the interior interface portion of the die body, a set of outermost peripheral slots disposed radially outwardly of the central slots, wherein the interior interface portion of the die body is configured to allow flow of the batch material from the first set of feedholes to the central slots and to the outermost peripheral slots; and a flow control device disposed at the inlet end of the die body, the flow control device comprising a flow blocking portion for blocking flow of the batch material at the inlet end of the die body into feedhole inlets of the first set of feedholes which directly feed the outermost peripheral slots.

In some embodiments, the flow control device contacts the inlet end of the die body.

In some embodiments, the apparatus further comprises a throttle disposed proximate the second set of feedholes at the outlet end of the die body, the throttle being axially movable with respect to the die body; in some of these embodiments, the throttle is capable of being spaced away from the outlet face of the die body to provide a reservoir capable of being fed by the second set of feedholes; in other of these embodiments, the throttle is capable of selectively blocking flow of batch material from at least some of the second set of feedholes at the outlet end of the die body; in other of these embodiments, the throttle is configured to selectively adjust flow of the batch material from the second set of feedholes to pass between the throttle and the die body; in other of these embodiments, the throttle includes a first perimeter portion and a second perimeter portion, and the first perimeter portion is adjustable independently of the second perimeter portion.

In some embodiments, the outlet end of the die body comprises a distal surface from which the set of central slots extends toward the interior interface portion of the die body, a first axially recessed surface surrounding the distal surface, and a second axially recessed surface surrounding the first axially recessed surface; in some of these embodiments, the first axially recessed surface is disposed farther toward the inlet end than the distal surface; in other of these embodiments, the second axially recessed surface is disposed farther toward the inlet end than the first axially recessed surface; in other of these embodiments, the central slots extend from the distal surface toward the interior interface portion of the die body; in other of these embodiments, the outermost peripheral slots extend from the first axially recessed surface toward the interior interface portion of the die body; in other of these embodiments, the second axially recessed surface contains no slots.

In some embodiments, the flow control device comprises a body having a plurality of through-holes each configured to align with a respective feedhole inlet of the second set of feedholes; in some of these embodiments, the through-holes are identical in shape and size with the feedhole inlets of the second set of feedholes.

In some embodiments, the flow control device comprises a central through-hole configured to allow flow of the batch material into the first set of feedholes except for the feedholes of the first set of feedholes which directly feed the outermost peripheral slots.

In some embodiments, the flow control device comprises an annular body, and the flow blocking portion is generally annular.

In some embodiments, the apparatus further comprises a mask disposed at the outlet end of the die body; in some of these embodiments, the mask contacts the die body, and in some of these embodiments, the mask comprises an inlet end proximate the outlet end of the die body, and an outlet end, wherein the inlet end comprises an axially protruding peripheral portion disposed proximate, and spaced away from, the first axially recessed surface of the die body, wherein the mask is configured to allow batch material from at least some of the second set of feedholes to flow between the mask and the die body.

In another set of embodiments, a method of extruding a honeycomb is disclosed herein comprising the steps of: providing a die body comprising an inlet end, an outlet end, a central axis, a first set of feedholes extending from the inlet end to an interior interface portion of the die body, a set of central slots extending from the outlet end to the interior interface portion of the die body, a set of outermost peripheral slots disposed radially outwardly of the central slots, wherein the interior interface portion of the die body is configured to allow flow of the batch material from the first set of feedholes to the central slots and to the outermost peripheral slots; and providing a flow control device at the inlet end of the die body to block flow of batch material at the inlet end of the die body into feedhole inlets of the first set of feedholes which directly feed the outermost peripheral slots.

In some embodiments, the die body further comprises a second set of feedholes extending through the die body from the inlet end to the outlet end, the method further comprising the steps of: dividing flow of batch material into a first quantity of batch material received by the first set of feedholes to form an inner matrix of intersecting walls of a honeycomb and a second quantity of batch material received by the second set of feedholes to form an outer skin of a honeycomb; and regulating a flow rate of batch material received by the second set of feed holes; in some of these embodiments, the flow control device further comprises a flow dividing device, wherein the step of dividing flow of batch material is achieved by mounting the flow dividing device with respect to the die body with a plurality of holes of the flow dividing device being aligned with respective feedhole inlets of the second set of feedholes; in other of these embodiments, the step of regulating the flow rate includes at least partially blocking a set of the plurality of holes of the flow dividing device; in other of these embodiments, the method further comprises the step of adjusting a volume of a reservoir located upstream of the second set of feedholes.

In another set of embodiments, a method is disclosed herein of forming a honeycomb body by extrusion of ceramic-forming batch material through an extrusion die, the honeycomb body having an outermost circumferential wall surrounding a matrix of intersecting honeycomb walls, the die comprising a die body comprising an inlet end, an outlet end, a central axis, a set of central slots extending from the outlet end to an interior interface portion of the die body, a set of outermost peripheral slots disposed radially outwardly of the central slots, wherein the interior interface portion of the die body is configured to allow flow of the batch material from a first set of feedholes to the central slots and to the outermost peripheral slots, the method comprising: providing a supply flow of the batch material to the inlet end of the die body; and splitting the supply flow into a central flow and a peripheral flow, wherein the central flow passes through the set of central slots to form the matrix of intersecting honeycomb walls, and the peripheral flow passes through the second set of feedholes and out the outlet end of the die body without passing through any slot in the die, wherein the outermost circumferential wall comprises batch material from the peripheral flow.

In some embodiments, the method further comprises throttling the batch material exiting the second set of feedholes; in some of these embodiments, the method further comprises throttling the batch material exiting the second set of feedholes using a throttle including at a first perimeter portion and a second perimeter portion, the first perimeter portion throttling the batch material exiting the second set of feedholes independently of the second perimeter portion throttling the batch material exiting the second set of feedholes; in other of these embodiments, the method further comprises preventing batch material from passing through the outermost peripheral slots, and in some of these embodiments, the method further comprises providing the first set of feedholes extending from the inlet end of the die body to the interior interface portion of the die body, and the second set of feedholes extending through the die body from the inlet end to the outlet end.

It will be apparent to those skilled in the art that various modifications and variations can be made without departing from the spirit and scope of the claimed invention.

What is claimed is:

1. A honeycomb extrusion apparatus for extruding batch material, the apparatus comprising:
a die body comprising an inlet end, an outlet end, a central axis, a first set of feedholes extending from the inlet end to an interior interface portion of the die body, a second set of feedholes extending through the die body from the inlet end to the outlet end, a set of central slots extending from the outlet end to the interior interface portion of the die body, a set of outermost peripheral slots disposed radially outwardly of the central slots, wherein the interior interface portion of the die body is configured to allow flow of the batch material from the first set of feedholes to the central slots and to the outermost peripheral slots, wherein the outlet end of the die body comprises a distal surface from which the set of central slots extends toward the interior interface portion of the die body, a first axially recessed surface surrounding the distal surface, and a second axially recessed surface surrounding the first axially recessed surface;
a flow control device disposed at the inlet end of the die body, the flow control device comprising a flow blocking portion for blocking flow of the batch material at the inlet end of the die body into feedhole inlets of the first set of feedholes which directly feed the outermost peripheral slots;

a mask disposed proximate the outlet end of the die body that is configured with a recessed section;

a throttle disposed proximate the second set of feedholes at the outlet end of the die body, the throttle being axially movable with respect to the die body, wherein the range of movement of the throttle is such that a reservoir capable of being fed by the second set of feedholes is formed when the throttle is spaced away from an outlet face of the second axially recessed surface, wherein when the volume of the reservoir is at its highest, a downstream face of the throttle contacts the recessed section of the mask and when the volume of the reservoir is at its lowest, an upstream face of the throttle contacts the second axially recessed surface; and a substantially tubular insert holder that is configured to enclose the mask and a substantially tubular insert that is partially housed interiorly of the insert holder, wherein the insert is axially moveable with respect to the insert holder and the insert is coupled to the throttle so that the insert and throttle are axially moveable as a unit.

2. The apparatus of claim 1 wherein the flow control device contacts the inlet end of the die body.

3. The apparatus of claim 1 wherein the first axially recessed surface is disposed farther toward the inlet end than the distal surface.

4. The apparatus of claim 1 wherein the second axially recessed surface is disposed farther toward the inlet end than the first axially recessed surface.

5. The apparatus of claim 1 wherein the central slots extend from the distal surface toward the interior interface portion of the die body.

6. The apparatus of claim 1 wherein the outermost peripheral slots extend from the first axially recessed surface toward the interior interface portion of the die body.

7. The apparatus of claim 1 wherein the second axially recessed surface contains no slots.

8. The apparatus of claim 1 wherein the flow control device comprises a body having a plurality of through-holes each configured to align with a respective feedhole inlet of the second set of feedholes.

9. The apparatus of claim 1 wherein the flow control device comprises a central through-hole configured to allow flow of the batch material into the first set of feedholes except for the feedholes of the first set of feedholes which directly feed the outermost peripheral slots.

10. The apparatus of claim 1 wherein the flow control device comprises an annular body, and the flow blocking portion is generally annular.

11. The apparatus of claim 1 wherein the insert and insert holder are configured to accept adjusting screws such that the insert and throttle move axially as a unit by manipulation of the adjusting screws.

* * * * *